Oct. 13, 1931.  C. HANER  1,827,653
PROCESS OF MANUFACTURING ESTERS
Filed May 17, 1929
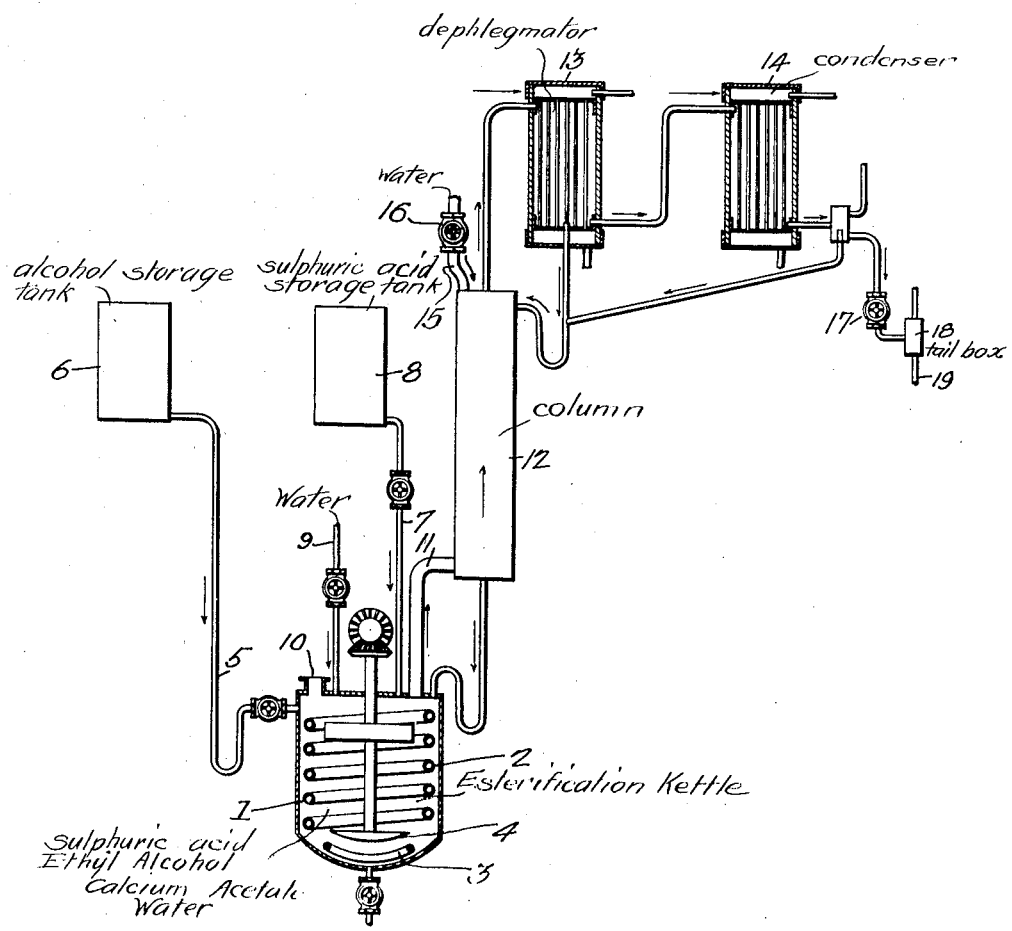

Patented Oct. 13, 1931

1,827,653

UNITED STATES PATENT OFFICE

CARL HANER, OF MOYLAN, PENNSYLVANIA, ASSIGNOR TO PUBLICKER, INC., OF PHILADELPHIA, PENNSYLVANIA, A CORPORATION OF DELAWARE

PROCESS OF MANUFACTURING ESTERS

Application filed May 17, 1929. Serial No. 363,962.

My invention relates to a process of manufacturing esters from the crude raw materials and more particularly it relates to a method of making ethyl acetate.

One object of my invention is to provide a process by which esters may be efficiently and expeditiously made from crude raw materials and in which the ester is removed from the system substantially free from acid and of a concentration higher in ester than the constant boiling mixture.

A further object is to provide a method of manufacturing esters, the carrying out of which results in a product which can be subjected to subsequent dehydration and rectification to obtain a substantially pure product without the difficulties heretofore encountered.

Still another object is to provide a process in which the reaction mixture is maintained as a liquid slurry throughout the reaction and distillation whereby efficient agitation is assured with accompanying higher yields and whereby better heat transfer and less wear on the equipment results. Other objects will be apparent from a consideration of the specification and claims.

In the attached drawing, I have shown diagrammatically one type of apparatus which may be used in carrying out the process of the present invention. My invention is capable of being accomplished in various types of apparatus, and the accompanying drawing is merely illustrative.

Esters are made by bringing about a reaction between the alcohol radical and the acid radical, usually in the presence of a catalyst such as sulphuric acid. Ethyl acetate is prepared by reacting ethyl alcohol and the acetic acid radical, which radical may be furnished by acetic acid itself or by its salts such as calcium or sodium acetate. In the case of other esters, the corresponding compounds are used, and while this invention contemplates the manufacture of esters generally, for convenience, the manufacture of ethyl acetate is described using a mixture of acetic acid or its salts, sulphuric acid, water, and ethyl alcohol as the crude raw materials.

In the manufacture of esters, usually as pure a compound as possible is desired but the pure product can only be obtained with difficulty when the reaction is carried out in the ordinary manner, due to the constant boiling mixture and the contamination of the ester by acid which are encountered. The constant boiling mixture is approximately 83% ester, 9% alcohol, and 8% water. In the progress of distillation when this composition is reached, the mixture passes from the system as a single compound and subsequent distillations fail to separate the ingredients further. The contaminating acid, which in the case of ethyl acetate is acetic acid, is difficult to remove without neutralization, small traces of the acid rendering the product unsuitable for many uses. A further disadvantage accompanying the usual methods of manufacturing esters lies in the tendency of material in the reacting kettle to solidify and deposit on the steam coils, agitator, and kettle walls, thus cutting down the heat transfer to a considerable extent and causing wear and corrosion of the equipment. When a calcium salt is used to furnish the acid radical, it reacts with sulphuric acid, used as a catalyst, forming calcium sulphate which furnishes a constant source of trouble when the material deposits or becomes baked.

My invention contemplates a process by which the ester product can be removed from the system uncontaminated by acid, thus obviating the neutralization step, and of a composition higher in ester content than the constant boiling mixture. The process also allows the use of a smaller amount of alcohol than is usually employed when approximately complete removal of the acetic acid is desired, and insures the presence of a liquid slurry in the kettle, thus precluding the possibility of incrustation of the apparatus. The present process, therefore, is not only simple and expedient to use but also effects material savings in material and labor costs, as well as in cutting down the wear and corrosion of the equipment.

The invention is characterized by the addition of water to the top of the column during the distillation, the addition of which breaks up the constant boiling mixture at the top of the column allowing the distillate to leave the column containing a smaller amount of alcohol than the constant boiling mixture. At the same time, the water carries the alcohol down the column giving it again an opportunity to react with more acid to form more ester, thus increasing the yield and allowing the use of a smaller amount of alcohol. The passage of the water and alcohol down the column carries back into the kettle any acid which may be in the column and the water returning to the kettle keeps the charge in a liquid slurry condition.

The mixture of ester, alcohol, and water comprising the distillate separates into two layers after condensation, the top layer containing from approximately 88% to 92% of ester and the bottom layer, which is small in amount, containing water, alcohol, and a little ester. The upper layer can be subjected to further dehydration and distillation to obtain a substantially pure ester with no difficulty since the proportion of ester is substantially above that of the constant boiling mixture. The lower or water layer can be used in subsequent charges and thus the small amount of ester present is recovered and the alcohol utilized. As hereinbefore pointed out, the alcohol used in the charge need not be present in as large an excess as is the usual practice when approximately a complete removal of the acetic acid is desired, but in order to insure a more complete reaction, alcohol is used somewhat in excess of the reacting proportions.

Referring to the drawing which illustrates diagrammatically one method of practicing the invention, 1 represents the esterification kettle having a closed steam coil 2, a sparger coil 3, and an agitator 4. The valved inlet pipe 5 and the valved inlet pipe 7 connect the alcohol storage tank 6 and the sulphuric acid tank 8 respectively with the esterification kettle 1. Valved inlet pipe 9 is the water connection to the kettle. The kettle is provided with a suitable manhole 10 through which solid materials may be supplied. Pipe 11 connects the esterification kettle 1 with the column 12 and in series with column 12 and connected therewith by suitable piping are the dephlegmator 13 and condenser 14. Line 15 with valve 16 is a water line and supplies water to the top of column 12. The condenser 14 is connected through suitable pipe connections including valve 17 to the tail box 18 which has outlet pipes 19 through which the distillate is removed to a settling tank (not shown). The dephlegmator 13 and condenser 14 are connected to the top of the column 12 by suitable piping.

In carrying out the process, one part by weight of sulphuric acid of a Baumé from 50° to 66°, one part by weight of 95% alcohol and one part by weight of water are run into the esterification kettle 1 through the various valved inlet pipes provided for that purpose. Then one part of acetate of lime is added slowly through the manhole 10. The lid is then clamped on the manhole and the materials heated by means of the closed steam coil 2. The valve 17 is closed at the beginning of the process.

The vapors from the kettle pass up the column 12 and are condensed in the dephlegmator 13 and condenser 14, the total condensate being returned to the column through the return lines without removing any product from the system. This is continued for a sufficient time to allow the system to come to equilibrium, for example the condensate may with advantage be returned to the column for about an hour. Valve 17 is then opened and water is supplied to the top of the column through water line 15 by opening valve 16, and in a few minutes, the condensate is removed from the tail box 18 to the settling tank (not shown). If the process is followed out, as directed, the condensate will separate into two layers, the top layer containing the ester and the bottom layer, which is small in amount, for the most part water and alcohol. The concentration of the ester layer varies somewhat but in all cases it is higher in ester than the constant boiling mixture and usually contains from 88% to 92% ester. The ester layer is removed from the settling tank and may then be subjected to dehydration and distillation to obtain the substantially pure ester, if that is desired. The water layer is added to the next charge since it contains alcohol and some ester.

The process is carried out until the bulk of the ester has been recovered. This is determined by the fact that the condensate no longer separates into two layers. When this occurs, the water in line 15 is shut off by closing valve 16 and the alcohol and ester remaining in the charge are distilled off and used in the next charge. The amount of water added to the top of the column may vary within rather wide limits, the exact amount used depending on various factors including the amount of raw materials used in the process and the concentration of ester desired. I have found that one hundred and fifty gallons of water may be advantageously added to the top of the column when the charge contains 4,800 lbs. of calcium acetate. This water is added at a uniform rate after the system comes to equilibrium, as hereinbefore pointed out, and the flow is continued for eight to ten hours. The calcium sulphate remaining in the esterification kettle 1 is in the form of a liquid slurry and can be removed from the kettle without difficulty, and when this is done, the system is ready for a new charge.

Considerable modification is possible in the process, in the apparatus used, and in the amount of water added to the column without departure from the essential features of my invention.

I claim:

1. The process of concentrating aliphatic esters which comprises distilling the crude mixture of aliphatic ester, alcohol, and water through a column, bringing additional water into contact with the vapor in the column near the top thereof in amounts sufficient to reduce the alcohol content of the vapor in said column to a point below that of the constant boiling mixture of ester, water and alcohol, condensing the distillate, allowing the condensed distillate to settle and separate into two layers, and thereafter removing the top concentrated ester layer.

2. The process of concentrating ethyl acetate which comprises distilling the crude mixture of ethyl acetate, alcohol, and water through a column, bringing additional water into contact with the vapor in the column near the top thereof in amounts sufficient to reduce the alcohol content of the vapor in said column to a point below that of the constant boiling mixture of ester, water and alcohol, condensing the distillate, allowing the condensed distillate to settle and separate into two layers, and thereafter removing the top concentrated ethyl acetate layer.

3. The step in the process of manufacturing aliphatic esters involving the use of a column which comprises bringing additional water into contact with the vapor in the column near the top thereof in amounts sufficient to cause the distillate after condensation to separate into two layers, the top layer containing the concentrated ester.

4. The process of manufacturing aliphatic esters which comprises reacting the raw materials to form the aliphatic ester, distilling the crude reaction mixture through a column, bringing additional water into contact with the vapor in the column near the top thereof in amounts sufficient to reduce the alcohol content of the vapor in said column to a point below that of the constant boiling mixture of ester, water and alcohol, condensing the distillate, allowing the condensed distillate to separate into two layers, and thereafter removing the top concentrated ester layer.

5. The process of manufacturing ethyl acetate which comprises reacting the raw materials to form the ethyl acetate, distilling the crude reaction mixture through a column, bringing additional water into contact with the vapor in the column near the top thereof in amounts sufficient to reduce the alcohol content of the vapor in said column to a point below that of the constant boiling mixture of ester, water and alcohol, condensing the distillate, allowing the condensed distillate to separate into two layers, and thereafter removing the top concentrated ethyl acetate layer.

6. The process of manufacturing ethyl acetate which comprises reacting ethyl alcohol and calcium acetate in the presence of sulphuric acid and water, distilling the crude reaction mixture through a column, bringing additional water into contact with the vapor in the column near the top thereof in amounts sufficient to reduce the alcohol content of the vapor in said column to a point below that of the constant boiling mixture of ester, water and alcohol, condensing the distillate, allowing the condensed distillate to separate into two layers, and thereafter removing the top concentrated ethyl acetate layer.

7. The process of manufacturing alipathic esters which comprises reacting the raw materials to form the aliphatic ester, distilling the mixture through a column and returning the distillate to the column for a period of time sufficient to allow the system to come to equilibrium, thereafter bringing additional water into contact with the vapor in the column near the top thereof in amounts sufficient to reduce the alcohol content of the vapor in said column to a point below that of the constant boiling mixture of ester, water and alcohol, condensing the distillate, allowing the condensed distillate to separate into two layers, and removing the top concentrated ester layer.

8. The process of manufacturing ethyl acetate which comprises reacting ethyl alcohol and calcium acetate in the presence of sulphuric acid and water, distilling the crude reaction mixture through a column and returning the distillate to the column for a period of time sufficient to allow the system to come to equilibrium, thereafter bringing additional water into contact with the vapor in the column near the top thereof in amounts sufficient to reduce the alcohol content of the vapor in said column to a point below that of that constant boiling mixture of ester, water and alcohol, condensing the distillate, and allowing the condensed distillate to separate into two layers and removing the top concentrated layer.

9. The step in the process of manufacturing aliphatic esters from materials resulting in the formation of a solid material in the esterification kettle involving the use of a column which comprises bringing additional water into contact with the vapor in the column near the top thereof in amounts sufficient to cause the vapor in said column after condensation to separate into two layers, the top layer containing the concentrated layer, and to cause the material in the esterification kettle to remain in the form of a liquid slurry.

10. The process of manufacturing aliphatic esters from materials resulting in the formation of a solid material in the estetrification kettle which comprises reacting the raw materials to form the aliphatic ester, distilling the crude reaction mixture through a column, bringing additional water into contact with the vapor in the column near the top thereof in amounts sufficient to reduce the alcohol content of the vapor in said column to a point below that of the constant boiling mixture of ester, water and alcohol, allowing the water to run down the column into the esterification kettle to keep the charge in the form of a liquid slurry, condensing the distillate, allowing the condensed distillate to separate into two layers, and thereafter removing the top concentrated ester layer.

11. The process of manufacturing ethyl acetate from materials resulting in the formation of a solid material in the esterification kettle which comprises reacting the raw materials to form the ethyl acetate, distilling the crude reaction mixture through a column, bringing additional water into contact with the vapor in the column near the top thereof in amounts sufficient to reduce the alcohol content of the vapor in said column to a point below that of the constant boiling mixture of ester, water and alcohol, allowing the water to run down the column into the esterification kettle to keep the charge in the form of a liquid slurry, condensing the distillate, allowing the condensed distillate to separate into two layers, and thereafter removing the top concentrated ethyl acetate layer.

12. The step in the process of manufacturing ethyl acetate involving the use of a column which comprises bringing additional water into contact with the vapor in the column near the top thereof in amounts sufficient to cause the distillate after condensation to separate into two layers, the top layer containing the concentrated ethyl acetate.

13. Steps in the process of manufacturing aliphatic esters involving the use of a column which comprises bringing additional water into contact with the vapor in the column near the top thereof in amounts sufficient to cause the distillate after condensation to separate into two layers, the top layer containing the concentrated ester, and continuing the addition of water until the condensate no longer separates into two layers.

14. Steps in the process of manufacturing ethyl acetate involving the use of a column which comprises bringing additional water into contact with the vapor in the column near the top thereof in amounts sufficient to cause the distillate after condensation to separate into two layers, the top layer containing the concentrated ethyl acetate, and continuing the addition of water until the condensate no longer separates into two layers.

15. The process of concentrating aliphatic esters which comprises distilling the crude mixture of aliphatic ester, alcohol and water through a column, bringing additional water into contact with the vapor in the column near the top thereof in amounts sufficient to reduce the alcohol content of the vapor in said column to a point below that of the constant boiling mixture of ester, water and alcohol, condensing the distillate, allowing the condensed distillate to settle and separate into two layers, and continuing the addition of water until the condensate no longer separates into two layers.

16. The process of concentrating ethyl acetate which comprises distilling the crude mixture of ethyl acetate, alcohol and water through a column, bringing additional water into contact with the vapor in the column near the top thereof in amounts sufficient to reduce the alcohol content of the vapor in said column to a point below that of the constant boiling mixture of ester, water and alcohol, condensing the distillate, allowing the condensed distillate to settle and separate into two layers, and continuing the addition of water until the condensate no longer separates into two layers.

CARL HANER.